United States Patent Office 3,042,988
Patented July 10, 1962

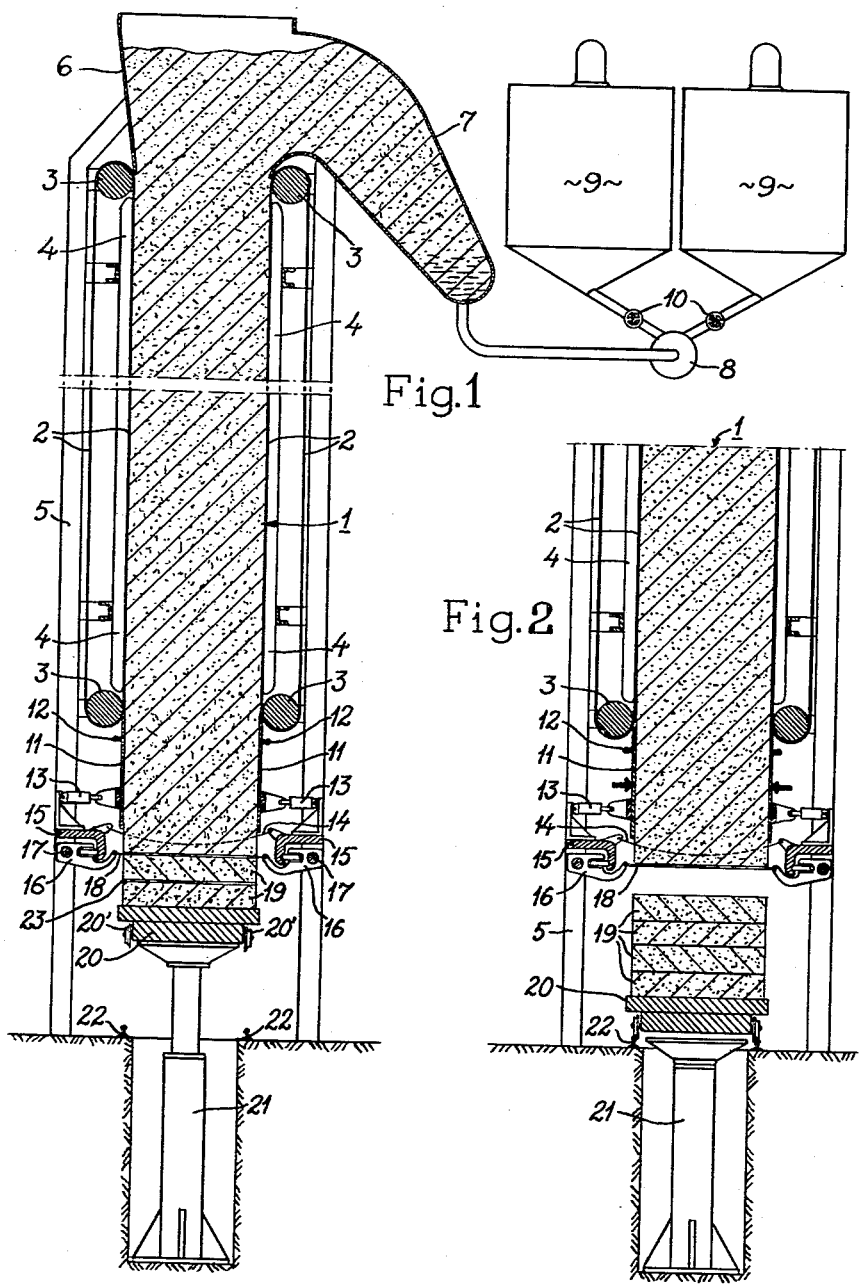

3,042,988
PLANT FOR THE MANUFACTURE OF CELLULAR LIGHT WEIGHT BUILDING ELEMENTS
Rolf Erik Goransson, Saltsjo-Duvnas, and Gustav Ingvar Roland Johansson, Hagersten, Sweden, assignors to Casius Corporation Limited, Montreal, Quebec, Canada
Filed Oct. 19, 1959, Ser. No. 847,255
6 Claims. (Cl. 25—2)

This invention relates to the manufacture of porous or cellular slabs, blocks and similar building elements from so called lightweight concrete and like mixtures containing hydraulic cements. More particularly the invention is concerned with the casting and molding plant involved in such manufacture.

It is well known within the related art that porous or cellular products of lightweight concrete or similar hydraulic cement mixtures may be obtained by expanding a suitable hydraulic cement composition before letting the same solidify in a mold to form a cheese-like body, which body may then be cut into desired pieces before being hardened by steam treatment or the like. The expansion of the basic mass or mixture may either be effected by incorporating small bubbles of air therein, such as by rapid and thorough whipping of the mass or by blowing air under pressure into it through certain nozzles or microporous filters, or by adding such gas-producing ingredients to the mass that the latter is caused to rise somewhat like bread dough.

It will be readily understood that the hydraulic cement mass thus expanded, to a considerable degree, will have a very low strength before being finally hardened. This is particularly so in view of the "shortness' of the basic cement mixture. As a consequence it has been a very definite opinion among men skilled in the art that the depth of the casting mold for such expanded masses should be limited to at least about three feet, and preferably should not exceed two feet. This is desirable in order to secure uniform porosity of the products and to prevent the weight of the cast body itself from breaking down the porous or cellular structure of the mass, particularly near the bottom of the mold.

The apparent limitation mentioned above means a considerable disadvantage in planning a factory for the production of porous lightweight building elements; particularly because the floor space required by the necessary casting molds will be very large. Since it is also well known to be far more advantageous from a factory economical point of view to cast very large bodies and subsequently cut them instead of casting smaller units directly, the development of the art has resulted in present factories frequently being designed to cast extremely unhandy, flat "cakes" having only a small depth or thickness but a considerable extension in the horizontal plane. When these giant "cakes" have solidified enough to be cut into the desired slabs or blocks, they not only require heavy and expansive equipments to be handled but also large space and considerable care.

It now has surprisingly been discovered, and proved by practical tests, that the above prevailing opinion about the depth of the casting mold is erroneous, and that it is possible in practice to use any desired depth of the casting mold up to at least 33 feet without hazarding the uniform porous structure of the products in question. This very important discovery has led to the development of a certain casting and molding procedure in the manufacture of porous lightweight building elements of concrete or like hydraulic cement mixtures which forms the subject matter of this invention.

In general the casting and molding procedure according to the present invention is characterized by the facts that the expanded mass of concrete or other hydraulic cement mixture is cast in a shaft-like casting mold having a depth representing a multiple of the desired vertical dimension of the products to be manufactured and being for instance of the order of 20 to 30 feet, and also that the solidified mass in a still semiplastic state is discharged through the lower end of said mold shaft and immediately cut into products of desired size.

By applying this invention in the manufacture of porous lightweight building elements of concrete or other hydraulic cement mixtures many valuable advantages may be gained. Thus considerably greater freedom in the design of the manufacturing plant makes it possible not only to save expensive floor space, but also to simplify the equipment for cutting and handling the products.

Furthermore it has been found that the invention results in certain quality improvements, particularly because the temperature rise within the mass (due to the chemical reactions taking place during its solidification) will be increased in the lower end of the casting mold shaft and beneficially accelerate the solidification process, while at the same time the considerable static pressure effectively will prevent the mass from cracking or blasting as a result of increased internal gas pressure.

Further advantages and features of the invention will become apparent from the following description in which reference is had to the accompanying drawing which by way of example and in a rather diagrammatical manner illustrates a plant for carrying out the invention. In the drawing:

FIG. 1 is a transverse sectional elevation, reduced in height, of a casting mold shaft, having at its lower, output end means for receiving the cut off products, the said means being shown in operative position, FIG. 2 is a partial sectional elevation similar to the lower part of FIG. 1 but showing the product receiving means in fully lowered position ready for removal.

In the plant shown in the drawing the casting mold proper is an open-ended vertical shaft 1 bordered by endless belts 2 running over horizontal rolls or pulleys 3 located near the top and bottom ends of the shaft respectively. To prevent the inner, wall-forming portions of the two belts 2 from sagging, guiding rails 4 of any suitable known construction are mounted in the frame structure 5 of the casting mold shaft to support the belts 2.

The upper end of the shaft 1 has attached thereto a funnel-like top construction 6 formed with a pocket lateral addition 7 into the lower end of which the basic hydraulic cement mixture is pumped by means of a pump 8 from either one of two separate mixers 9. The outlets of the two mixers 9 are connected to the pump inlet through suitable valves 10 so that the mixers can alternately deliver ready made cement mixture to the pump 8 and thus assure a continuous supply of such mixture to the casting mold shaft, if desired.

In the particular example shown in the drawing it is assumed that the basic hydraulic cement mixture is of the so called gas concrete type which is caused to expand by the addition of gas producing ingredients to the mixture shortly before the same is pumped into the lower end of the pocket 7. In such a case the basic cement mixture is pumped from the mixers 9 as a sludge while the expansion of the mixture takes place in the pocket 7. As the mixture expands forming a porous, semi-liquid paste, it will then overflow the lower edge of the opening through which the pocket 7 communicates with the funnel-like construction 6 and thus the cement mixture will enter the shaft 1 in an expanded but still viscous or plastic condition. The same overflow principle suitably may be used also when starting from a mixture which is made porous by whipping or by blowing air thereinto, but in such a case the pocket 7 may be modified and extended to form a complete whipping chamber containing suitable agitators or air blowing equipment.

At the lower end of the casting mold shaft 1 the porous mass, which as a result of internal chemical reactions has been solidified during the passage through the shaft 1 and thus is now in a semi-plastic state, is discharged through a lower shaft extension including flaps 11 suspended from horizontal hinges 12 on opposite sides of the shaft extension. These flaps 11 are movable towards and away from each other, for instance by means of suitable jacks 13, so that the flaps may alternatively be released from the extruded mass or pressed together about the same to prevent the contents of the casting mold shaft from uncontrolled downward movement.

As the solidified mass is discharged between the flaps 11 it suitably passes a number of transversely extending cutting wires 14 stretched between holders secured in suitable locations along two beams 15 which extend on either side of the casting mold shaft 1. By means of said cutting wires 14 the extruded mass will be cut up in transverse direction into suitable sections corresponding in size to the slabs or blocks to be manufactured. It will be understood then that the casting mold shaft 1, though relatively narrow in width, may have a considerable length and thus produce either a low number of elongate slabs or a row of relatively short blocks lying in end to end relationship all dependent of the number and locations of the transverse cutting wires 14 used.

The longitudinally extending beams 15 are also formed to provide races or guides for each small carriage or slide 16, the two slides 16 being movable in synchronism along the respective beams 15 by means of feeding screws 17. Between the two carriages or slides 16 there is stretched another cutting wire 18 arranged to cut the extruded, cheese-like mass horizontally into slices or slabs 19 when the carriages or slides are moved from one end to the other end of the beams 15. Sufficient space is then provided outside each end wall of the casting mold shaft 1 to take up the carriages or slides 16 after each stroke so that the cutting wire 18, when not operative, does not disturb the extrusion of the mass from the casting mold shaft.

The severed blocks or piles of slabs 19 are received on a truck 20 which is placed on a lifting device 21 shown as being of the hydraulic jack type. By means of this lifting jack 21, the truck 20 may be elevated to a position wherein the top surface of the truck substantially seals against the lower edges of the flaps 11 to thereby form a bottom for the casting mold shaft 1. With the truck 20 in this position the casting process in the shaft 1 may be initiated by gradually filling the shaft with expanded concrete mass. As soon as the contents of the lowermost portion of the casting mold shaft has solidified to a suitable degree (somewhat resembling cheese), the truck 20 is lowered to let the contents of the shaft 1 be partially discharged between the flaps 11 which are at this time slightly spread apart.

The transverse cutting wires 14 will now start cutting the extruded mass into sections as desired. When the truck 20 has been lowered to a position wherein its top surface is at a level below the slicing cutting wire 18, corresponding to the desired height or thickness of the block or slabs to be manufactured, the downward movement of the truck is interrupted and the carriages or slides 16 are caused to move from the one end of the casting mold shaft 1 to the other and thereby separate a slab or block 19 from the extruded plug of solidified mass suspended below the flaps 11.

As soon the the desired number of blocks or slabs 19 has been severed by means of the slicing wire 18, the flaps 11 are compressed around the remaining plug of solidified mass in the lower end of the casting mold shaft 1. Thereafter the truck 20 may be lowered completely as shown in FIG. 2 to rest with its wheels 20 on rails 22 extending along opposite sides of the lifting device 21. Thus the truck 20 with its load of blocks or slabs may be moved out from under the casting mold shaft and sent, for example, to an autoclave for steam treatment of its load. A new truck may then be moved in above the lifting device 21 to be in turn elevated to receive a further number of products in the same manner. It will be understood, however, that it is now only necessary to elevate the truck to the level at which the slicing wire 18 operates.

As the contents of the casting mold shaft 1 is extruded through the lower end of the shaft and removed by means of the trucks as described, fresh material is fed into the upper end of the shaft 1 from the pocket 7. The fresh material then will have sufficient time also to solidify into a semi-plastic, cheese-like state as it passes through the vertical, open-ended shaft 1 which may have a height of 20 to 30 feet or even more, if desired. Thus the mass in the lower end of the casting mold shaft 1 will have gained sufficient strength to no longer need the support of the shaft walls. It will also ordinarily, be sufficiently "dry" to be cut into slices as described without re-uniting on the truck if piled thereon.

On the other hand, means may of course be provided to take care of the slices one by one as soon as they are cut off. It will also be possible to close the flaps 11 and to slightly lower the truck 20 after each slicing stroke of the wire 18 to permit the insertion of a separating foil or panel as indicated at 23 in FIG. 1 on top of the recently cut slab before the truck is again elevated to receive a further slab.

It will be understood that the use of endless belts 2 for forming at least the longitudinal side walls of the casting mold shaft offers the advantage that the sliding friction between said walls and the contents of the casting mold shaft may be eliminated. Furthermore, the belts may be driven or retarded as desired to promote a controlled extrusion of the solidified mass at the lower end of the shaft. It has also been found advisable to arrange the belts 2 forming the side walls of the shaft in such a manner that the distance between them near the lower end of the shaft 1 is slightly less than at the upper end of the shaft. This will not only result in an improved discharge control but also in a slight compression of the expanded mass which frequently has been found advantageous.

The extension flaps 11 of the shaft may also be formed as endless belts, but at least if the width of the shaft is only a small fraction of the length thereof, which design is ordinarily preferred, it may be quite sufficient to use simple, vertical sheet metal flaps as walls at the ends of the shaft. Likewise, while the invention comprises particularly endless or moving belts as walls for the shaft 1, stationary metal walls, or hinged flaps similar to 11, are also within the concept of this invention.

It should be understood that several changes and modifications of the structural details hereinbefore described may be resorted to without hazarding the favorable results of the inventive idea. Therefore the foregoing detailed description must only be taken as an illustration of one manner in which the invention may be practically applied.

We claim:

1. In a plant for the manufacture of cellular, light weight building elements of concrete and similar hydraulic cement mixtures, a casting equipment comprising a vertical, open-ended mold shaft of substantial height, an overflow chamber communicating with the upper end of said shaft, means for supplying expandable hydraulic cement mixture to said chamber to cause expansion of the mixture therein and thereby promote the overflow of said expanded mixture into said shaft, means at the lower end of said shaft for controlling the discharge therethrough of the solidified, cellular mass formed from said hydraulic cement mixture as a result of chemical reactions therein, horizontally reciprocatable cutting means arranged beneath the lower discharge end of said shaft to cut the discharged mass into slices, means for receiving said cut-off slices, said latter means comprising a vertically adjustable supporting surface arranged under the lower end of said shaft, and means for elevating said surface into contact with the under side of the mass discharged from said shaft.

2. In a plant for the manufacture of cellular, lightweight building elements of concrete and similar hydraulic cement mixtures, a casting equipment as claimed in claim 1 wherein said mold shaft has walls formed of endless, vertically running belts.

3. In a plant for the manufacture of cellular, lightweight building elements of concrete and similar hydraulic cement mixtures, a casting equipment as claimed in claim 2, wherein the distance between opposed shaft walls formed by endless belts is slightly less near the lower end of the shaft than near the top thereof.

4. In a plant for the manufacture of cellular, lightweight building elements of concrete and similar hydraulic cement mixtures, a casting equipment as claimed in claim 1, wherein said means for controlling the discharge of the solidified, cellular mass through the lower end of the shaft comprise opposed shaft wall surfaces capable of being pressed together to clamp the solidified, cellular mass between them and means for effecting such movement of said wall surfaces.

5. In a plant as set forth in claim 4 in which at least one stationary transverse cutting wire is used across the lower end of the mold shaft to cut the discharged cellular mass into several separate columns before slicing off said discharged mass from the contents of the mold shaft.

6. In a plant as set forth in claim 5 wherein the mold is in the range of 20 to 30 feet and the vertical thickness of the severed building element is in the range of 3 inches to 36 inches.

References Cited in the file of this patent

UNITED STATES PATENTS

| | | |
|---|---|---|
| 663,140 | Walker et al. | Dec. 4, 1900 |
| 1,073,856 | Jacobsen | Sept. 23, 1913 |
| 1,405,671 | Crozier | Feb. 7, 1922 |
| 1,615,966 | Straight | Feb. 1, 1927 |
| 1,733,706 | Widin | Oct. 29, 1929 |
| 2,099,265 | Freyssiret | Nov. 16, 1937 |
| 2,278,513 | Emerson | Apr. 7, 1942 |
| 2,728,939 | Behr | Jan. 3, 1956 |
| 2,912,738 | Bergling et al. | Nov. 17, 1959 |